United States Patent
Gerbl et al.

(10) Patent No.: US 12,407,427 B2
(45) Date of Patent: Sep. 2, 2025

(54) APPARATUS AND METHOD FOR GENERATING AN OUTPUT SIGNAL WITH ADJUSTABLE PHASE NOISE, AND SYSTEM

(71) Applicant: Rohde & Schwarz GmbH & Co. KG, Munich (DE)

(72) Inventors: Florian Gerbl, Olching (DE); Sebastian Kehl-Waas, Landshut (DE); Florian Ramian, Karlsfeld (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 18/449,760

(22) Filed: Aug. 15, 2023

(65) Prior Publication Data

US 2025/0062839 A1    Feb. 20, 2025

(51) Int. Cl.
*H04B 17/12*    (2015.01)

(52) U.S. Cl.
CPC ..................... *H04B 17/12* (2015.01)

(58) Field of Classification Search
CPC .................................................. H04B 17/12
USPC ........................................................ 375/226
See application file for complete search history.

(56) References Cited

U.S. PATENT DOCUMENTS

| | | | |
|---|---|---|---|
| 8,248,297 B1 * | 8/2012 | Baker | G01S 7/4052 342/174 |
| 11,424,841 B1 * | 8/2022 | Mohindra | H04B 17/14 |
| 2025/0141437 A1 * | 5/2025 | Ferrara | H03K 5/01 |

FOREIGN PATENT DOCUMENTS

CN    103067070 A    4/2013

\* cited by examiner

*Primary Examiner* — Kevin M Burd
(74) *Attorney, Agent, or Firm* — Westman, Champlin & Koehler, P.A.

(57) ABSTRACT

The present invention relates to a method and an apparatus for generating an output signal with adjustable phase noise. The apparatus comprises waveform generation circuitry configured to generate a reference signal. Further, the apparatus comprises oscillator circuitry configured to generate an adjustable local oscillator (LO) signal. In addition, the apparatus comprises mixer circuitry coupled to the waveform generation circuitry and the oscillator circuitry and configured to mix the reference signal with the LO signal (LO) to generate the output signal having phase noise based on the LO signal. Further, the present invention relates to a system comprising such apparatus.

16 Claims, 2 Drawing Sheets

APPARATUS AND METHOD FOR GENERATING AN OUTPUT SIGNAL WITH ADJUSTABLE PHASE NOISE, AND SYSTEM

TECHNICAL FIELD

The present disclosure relates to device testing, and particularly to an apparatus for generating an output signal with adjustable phase noise, a method for generating an output signal with adjustable phase noise, and a system for testing a device.

BACKGROUND

For example, in research and development, product testing, etc. of in particular electronic devices, it is desirable to simulate and measure the effect of certain signals and/or signal characteristics, e.g. non-ideal signals, on signal processing in a device under test (DUT).

When an oscillator is used in a DUT, the oscillator may suffer from phase noise, that is, the oscillator signal may include other adjacent spectral components in addition to the intended frequency. The phase noise of the oscillator signal may, for example, affect the signal processing in the DUT.

SUMMARY

It would therefore be desirable to be able to measure the effect of an oscillator signal having phase noise on signal processing in a DUT.

This demand is met by the subject-matter of the independent claims.

Further advantageous embodiments are subject-matter of the dependent claims.

According to a first aspect, there is provided an apparatus for generating an output signal with adjustable phase noise. The apparatus comprises waveform generation circuitry configured to generate a reference signal. Further, the apparatus comprises oscillator circuitry configured to generate an adjustable local oscillator (LO) signal. In addition, the apparatus comprises mixer circuitry coupled to the waveform generation circuitry and the oscillator circuitry and configured to mix the reference signal with the LO signal to generate the output signal having phase noise based on the LO signal.

According to a second aspect, there is provided a system for testing a device. The system comprises a user interface configured to receive user input indicating at least a desired phase noise of an output signal. Further, the system comprises an apparatus coupled to the user interface. The apparatus comprises waveform generation circuitry configured to generate a reference signal. Further, the apparatus comprises oscillator circuitry configured to generate an adjustable local oscillator (LO) signal. In addition, the apparatus comprises mixer circuitry coupled to the waveform generation circuitry and the oscillator circuitry and configured to mix the reference signal with the LO signal to generate the output signal based on the user input.

According to a third aspect, there is provided a method for generating an output signal with adjustable phase noise. The method comprises generating a reference signal having a specified waveform. Further, the method comprises generating an adjustable local oscillator (LO) signal. In addition, the method comprises mixing the reference signal with the LO signal to generate the output signal having phase noise based on the LO signal.

The present disclosure allows to simulate and measure the effect of a non-ideal oscillator signal on signal processing of a device-under-test (DUT). In, for example, satellite communications, i.e., when the DUT is used in satellite communications, the DUT may comprise at least one oscillator, e.g., such as a local oscillator (LO) or any other type of oscillator, which inherently suffers from phase noise of its oscillator signal. The present disclosure provides means for generating a non-ideal signal, i.e. the generated output signal as referred to herein, that mimics such a non-ideal oscillator signal and/or LO signal comprising phase noise. Accordingly, the proposed apparatus, system, and method may be used to test the influence of such an output signal on signal processing in the DUT. As the output signal of the apparatus is used for testing the DUT, it may also be referred to as test signal. In other words, the present disclosure allows for determining and/or analyzing the behavior of the DUT depending on the phase noise. The phase noise is accordingly adjustable, in particular adjustable by a user and/or operator, and may therefore be specified as desired. The apparatus thus allows the output signal to be generated with a specified, desired phase noise.

As used herein, the waveform generation circuitry, which may also be referred to as waveform generator, may be implemented by or may comprise any electronic circuit and/or software-implemented circuit configured to generate different types of waveforms over a range of frequencies. The waveform generation circuitry may be implemented by, for example, one or more of a function generator, an arbitrary waveform generator, or the like. The reference signal may be specified by a user and may include at least substantially no noise, in particular no phase noise.

Further, as used herein, the oscillator circuitry may be any oscillator configured to generate an LO signal. For example, the oscillator circuitry may comprise at least one LO, i.e. at least one local oscillator. In at least some embodiments, it may be partly implemented as or may part of an in-phase-and-quadrature (I/Q) modulator or the like. Further, by way of example, the oscillator circuitry may comprise a vector signal generator or the like.

As used herein, the mixer circuitry may also be referred to as mixer, frequency mixer, or the like. It may be implemented in electronics and/or software and configured to creates a new frequency from two signals applied to it. For example, the mixer circuitry may be implemented as a digital device. Further, the mixer circuitry may be configured to receive the reference signal and the LO signal and produce the output signal on that basis. In at least some embodiments, the mixer circuitry may be partly implemented as or may part of an I/Q modulator or the like.

Further, optionally, the apparatus may comprise input circuitry configured to receive user input. For example, the input circuitry may be coupled to one or more of the waveform generation circuitry, the oscillator circuitry, and the mixer circuitry. Further, the input circuitry may be configured to provide, e.g. either directly or via a processing circuitry or the like, signal specification and/or signal characteristics of the respective input and/or output signal to one or more of the waveform generation circuitry, the oscillator circuitry and the mixer circuitry. In other words, a user may be able to input desired signal specification and/or characteristics to be used by the waveform generation circuitry, the oscillator circuitry, and the mixer circuitry.

Further, optionally, the apparatus may comprise processing circuitry and/or control circuitry configured to control operation of the apparatus, and particularly of the waveform generation circuitry, the oscillator circuitry and the mixer circuitry. For example, the processing circuitry and/or control circuitry may be implemented using one or more of an application specific integrated circuit (ASIC), a field programmable gate array (FPGA), a processor executing software, a microprocessor, a CPU, or other circuitry.

Further embodiments of the present disclosure are subject-matter of the dependent claims and of the following description, referring to the appended drawings. The aspects and embodiments described herein may be combined with each other, unless otherwise indicated in this disclosure.

According to an embodiment, the LO signal may include the phase noise, or more generally at least one noise component. The LO signal may be based on, for example, a radio frequency (rf) signal, a high frequency (hf) signal, or the like. The LO signal may also include amplitude noise. For example, the noise may be generated by modulation or the like.

In an embodiment, the apparatus may further comprise at least one filter. The oscillator circuitry may be configured to generate the LO signal with the phase noise based on white Gaussian noise filtered by the filter with a behavior corresponding to the phase noise.

According to an embodiment, the apparatus may further comprise a modulated rf, hf, etc. signal source coupled to the oscillator circuitry. The oscillator circuitry may be configured to generate the LO signal based on a corresponding modulated rf signal. For example the signal source may be a signal generator.

In an embodiment, the oscillator circuitry may be configured to receive data indicating specified, e.g. defined or predefined, phase noise characteristics, and to generate the LO signal based on the received data. In other words, the apparatus may be configured to generate the desired phase noise according to specified, e.g. predefined, phase noise characteristics. The data indicating specified phase noise characteristics may be generated based on user input indicating the desired phase noise.

According to an embodiment, the apparatus may further comprise processing circuitry configured to generate and/or process the data indicating specified phase noise characteristics based on a phase noise curve input and control the oscillator circuitry to generate the LO signal based on the data. The data may be provided in at least one data file or the like. The phase noise curve may be based on a computer model or the like.

In an embodiment, the data indicating specified phase noise characteristics may comprise in-phase-and-quadrature (I/Q) data. IQ data may be understood as a two-dimensional stream of information about how to modulate the I and Q phases, e.g. of a sine wave or the like. The IQ data may be generated by using any suitable programming language. For example, the IQ data may be based on the phase noise curve. The apparatus, at least with the oscillator circuitry thereof, may be configured to I/Q modulate a carrier signal with the I/Q data to generate the LO signal having the desired phase noise.

According to an embodiment, the oscillator circuitry may be configured for in-phase-and-quadrature (I/Q) modulation. For example, the oscillator may form at least part of an I/Q modulator or the like, or may comprise or may be implemented as an I/Q modulator.

In an embodiment, the reference signal may be a baseband or an intermediate frequency (IF) signal. The reference signal may be understood as the signal to which the phase noise is to be added intentionally to analyze on that basis the behavior, e.g. the behavior of signal processing, of the DUT.

According to an embodiment, the waveform generation circuitry may comprise or may be configured as an arbitrary waveform generator.

In an embodiment, the apparatus may further comprise an output node and/or interface circuitry coupled to at least the mixer circuitry and configured to output the output signal to be injected into a device-under-test (DUT). In other words, the apparatus may form at least part of a testing environment, e.g. a testing system, such as the system according to the second aspect.

According to an embodiment, the mixer circuitry may comprise, may be part of, or may be configured as an in-phase-and-quadrature (I/Q) modulator. The I/Q modulator may comprise an LO, and a mixer, and, optionally, further elements.

In an embodiment, the apparatus may be further configured to receive input data indicating desired characteristics of at least one of the desired output signal, the desired phase noise of the output signal, the desired LO signal, and the desired reference signal, to correspondingly cause the oscillator circuitry, the mixer circuitry, and/or the waveform generation circuitry to generate its respective signal based on the input data. For example, the input data may be received via a user interface, or the like, configured to receive user input forming the input data. By way of example, the user may be able to specify one or more characteristics of the respective signal(s).

The apparatus may be configured to carry out the method according to the third aspect. Further, the apparatus may be part of the system according to the second aspect. The system may be a testing system for testing a DUT. For example, the system may be configured satellite communications behavior of the DUT, wherein this is not limited herein, and the testing may also relate to other behavior of the DUT affected by the presence of phase noise.

For example, the method may be implemented by using a computer program comprising instructions, e.g. stored in memory, that when executed by a processor, such as the processing circuitry, cause the processor to carry out the method. The computer program may be stored on a computer-readable medium.

The user interface may comprise a number of graphical display elements and/or a number of graphical input elements operatively connected to the oscillator circuitry, the mixer circuitry, and/or the waveform generation circuitry. The user interface may be configured to receive, provide, and/or process user input to control the oscillator circuitry, the mixer circuitry, and/or the waveform generation circuitry on that basis. For example, a user may be able to specify signal characteristics of at least one of the desired output signal, the desired phase noise of the output signal, the desired LO signal, and/or the desired reference signal, to correspondingly cause the oscillator circuitry, the mixer circuitry, and/or the waveform generation circuitry to generate its respective signal based on the input data.

Where appropriate, the above-mentioned configurations and embodiments can be combined with each other, unless otherwise indicated. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
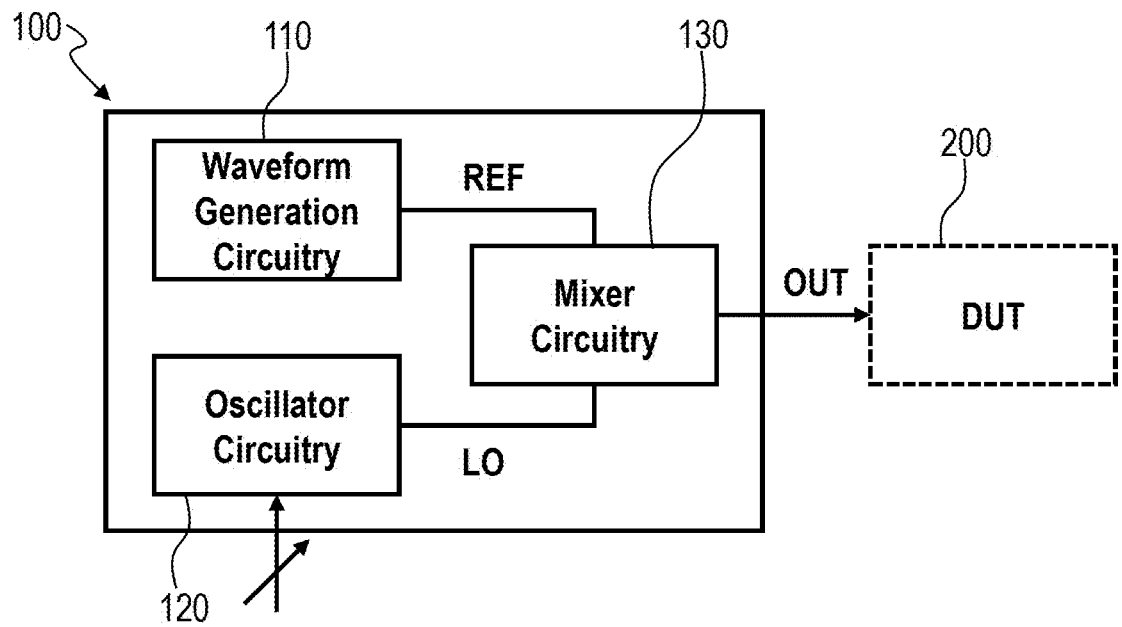
FIG. 1 illustrates in a schematic block diagram an exemplary apparatus for generating an output signal with adjustable phase noise, according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The embodiments in the drawings are not necessarily shown in scale.

In the drawings, same, functionally equivalent and identical operating elements, features and components are provided with same reference signs in each case, unless stated otherwise.

DESCRIPTION OF EMBODIMENTS

FIG. 1 illustrates in a schematic block diagram an apparatus 100 for generating an output signal OUT with adjustable phase noise. Apparatus 100 may be configured for device testing, and particularly to inject the output signal OUT into a device-under-test (DUT) 200, which is indicated in FIG. 1 in dashed lines. This may be of interest wherever a specific or specified phase noise is to be simulated and its effect on the DUT, e.g. on the signal processing thereof, is to be measured. Merely by way of example, apparatus 100 may be applied in a test environment for satellite communication.

Apparatus 100 comprises waveform generation circuitry 110 configured to generate a reference signal REF. Further, apparatus 100 comprises oscillator circuitry 120 configured to generate an adjustable local oscillator (LO) signal LO. This adjustability of the oscillator circuitry 120 is indicated in FIG. 1 by two arrows. In addition, apparatus 100 comprises mixer circuitry 130 coupled to the waveform generation circuitry 110 and the oscillator circuitry 120 and configured to mix the reference signal REF with the LO signal LO to generate the output signal OUT having phase noise based on the LO signal.

In at least some embodiments, the LO signal LO may include or may be indicative for the desired phase noise. The phase noise to be added to the reference signal REF may be specified and/or predefined. For example, a user and/or operator of the apparatus 100 may input one or more characteristics of the desired phase noise, upon which input the LO signal LO may be adjusted accordingly. Adjusting the LO signal LO may cause the output signal OUT to have the desired phase noise.

In addition, in at least some embodiments, the reference signal may be a baseband or an intermediate frequency (IF) signal.

Further, in at least some embodiments, the oscillator circuitry 120 may be configured to receive data indicating specified phase noise characteristics, and to generate the LO signal LO based on the received data. For this purpose, the oscillator circuitry 120 may comprise an input node or the like configured to be coupled to a suitable data source and to receive the corresponding data. In at least some embodiments, the data indicating specified phase noise may comprise in-phase-and-quadrature (I/Q) data. Further, the oscillator circuitry 120 may be configured for in-phase-and-quadrature (I/Q) modulation and to generate the LO signal LO accordingly.

In at least some embodiments, the waveform generation 110 circuitry may comprise or may be configured as an arbitrary waveform generator.

Further, the mixer circuitry 130 may comprise or may be configured as a modulator, and particularly as an in-phase-and-quadrature (I/Q) modulator. Alternatively, the mixer circuitry 130 may be any other type of mixer, e.g. digital mixer, or the like. Further, an output node of the mixer circuitry 130 may be configured to output the output signal to be injected into the DUT 200. Further, Further, in at least some embodiments, apparatus 100 may be further configured to receive input data indicating desired characteristics of at least one of the desired output signal OUT, the desired phase noise of the output signal OUT, the desired LO signal LO, and/or the desired reference signal RF. Based on this, apparatus 100 may be further configured to correspondingly cause the oscillator circuitry 120, the mixer circuitry 130, and/or the waveform generation circuitry 110 to generate its respective signal based on the input data.

Figure 2:
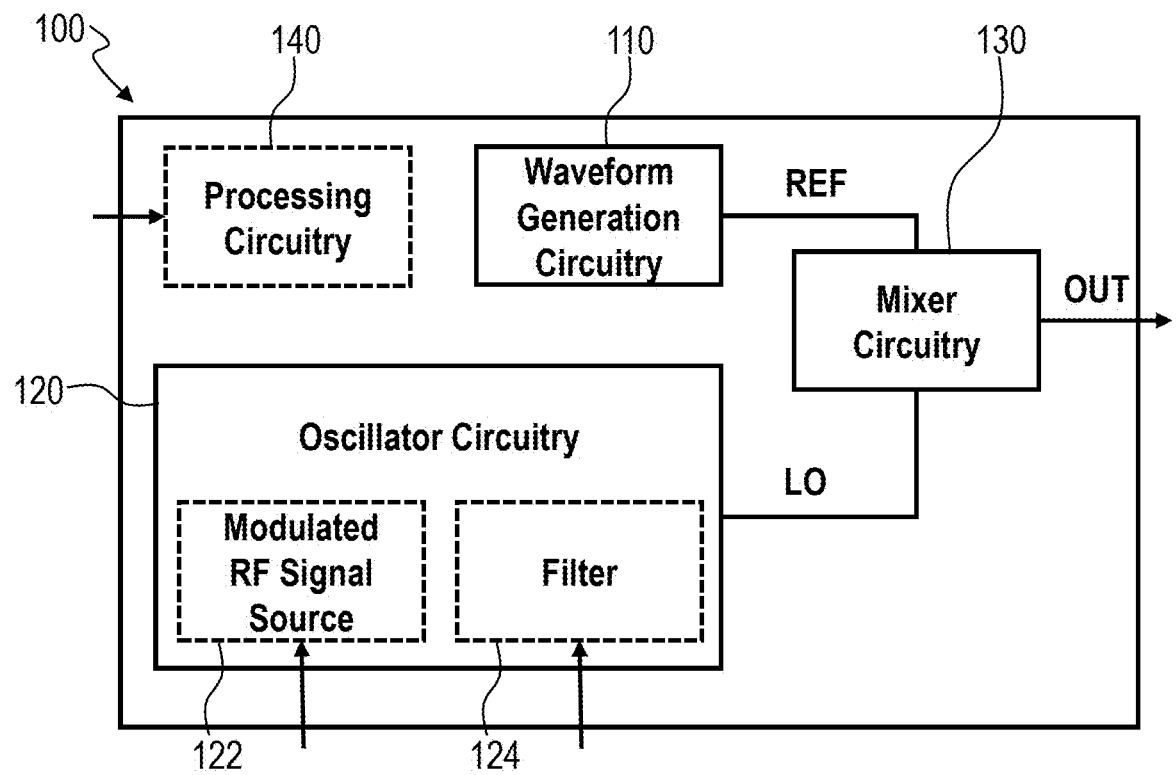
FIG. 2 illustrates in a schematic block diagram another exemplary apparatus for generating an output signal with adjustable phase noise, according to an embodiment.

FIG. 2 shows in a schematic block diagram the apparatus 100 comprising one or more of further, optional elements and/or implementations, as illustrated in FIG. 2 with dashed lines.

For example, in at least some embodiments, the apparatus 100 may further comprise a modulated radio frequency (rf) signal source 122 coupled to the oscillator circuitry 120. The oscillator circuitry 120 may be configured to generate the LO signal LO based on a corresponding modulated rf signal. Further, the oscillator circuitry 120 may be configured to generate the LO signal LO with the phase noise based on white Gaussian noise filtered by a filter 124 with a behavior corresponding to the phase noise.

Further, in at least some embodiments, apparatus 100 may further comprise processing circuitry 140 configured to generate and/or process the above-mentioned data indicating specified phase noise based on a phase noise curve input and provide the data to the oscillator circuitry 120. Further, processing circuitry 140 may be coupled to one or more of the other elements of apparatus 100, and to control the operation of apparatus 100 and/or its elements as described herein.

Figure 3:
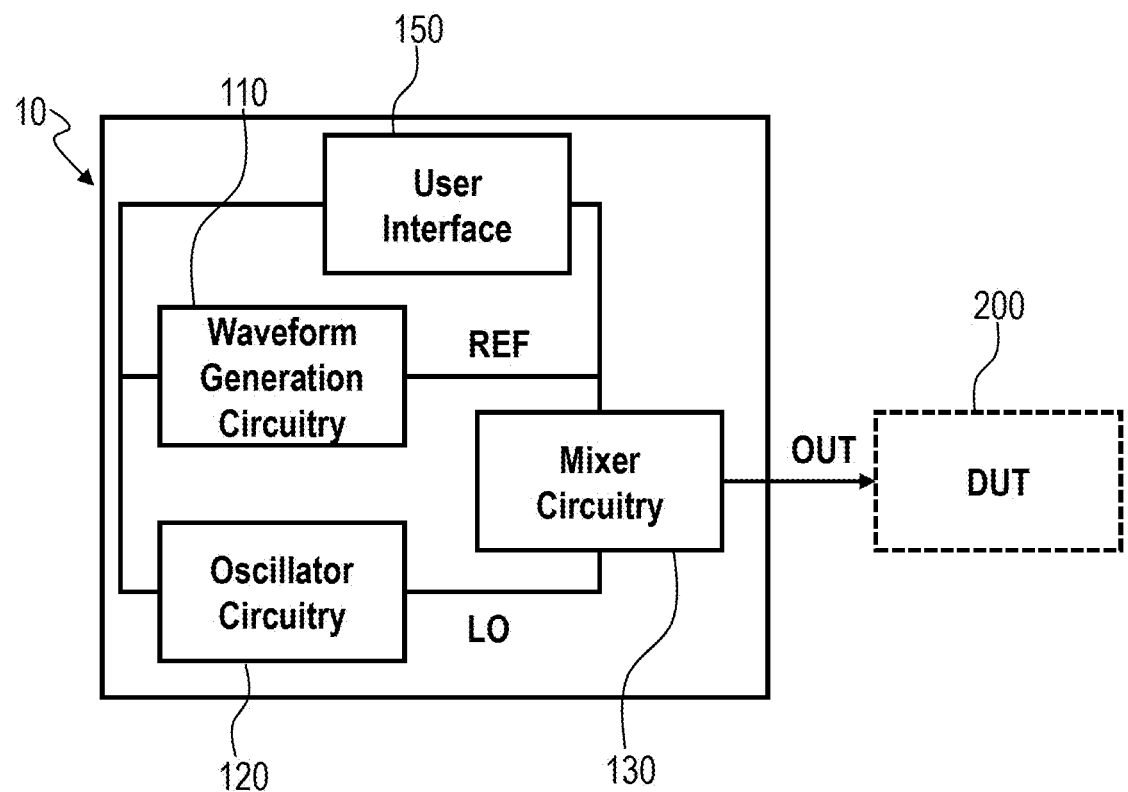
FIG. 3 illustrates in a schematic block diagram an exemplary system for testing a device, according to an embodiment.

FIG. 3 illustrates in a schematic block diagram an exemplary system 10 comprising the apparatus 100 as described herein and a user interface 150. The user interface 150 may alternatively integrated into the apparatus 100, so that apparatus 100 may further comprise the user interface 150.

The user interface 150 is coupled to the apparatus 100. Further, the user interface 150 is configured to receive user input indicating at least the desired phase noise of the output signal OUT.

For example, the user interface 150 may comprise a number of graphical display elements and/or a number of graphical input elements operatively connected to the oscillator circuitry, the mixer circuitry, and/or the waveform generation circuitry. The user interface 150 may be configured to receive, provide, and/or process user input to control the oscillator circuitry 120, the mixer circuitry 130, and/or the waveform generation circuitry 110 on that basis. For example, a user may be able to specify signal characteristics of at least one of the desired output signal OUT, the desired phase noise of the output signal, the desired LO signal, and/or the desired reference signal, to correspondingly cause the oscillator circuitry 120, the mixer circuitry 130, and/or the waveform generation circuitry 110 to generate its respective signal based on the input data.

Figure 4:
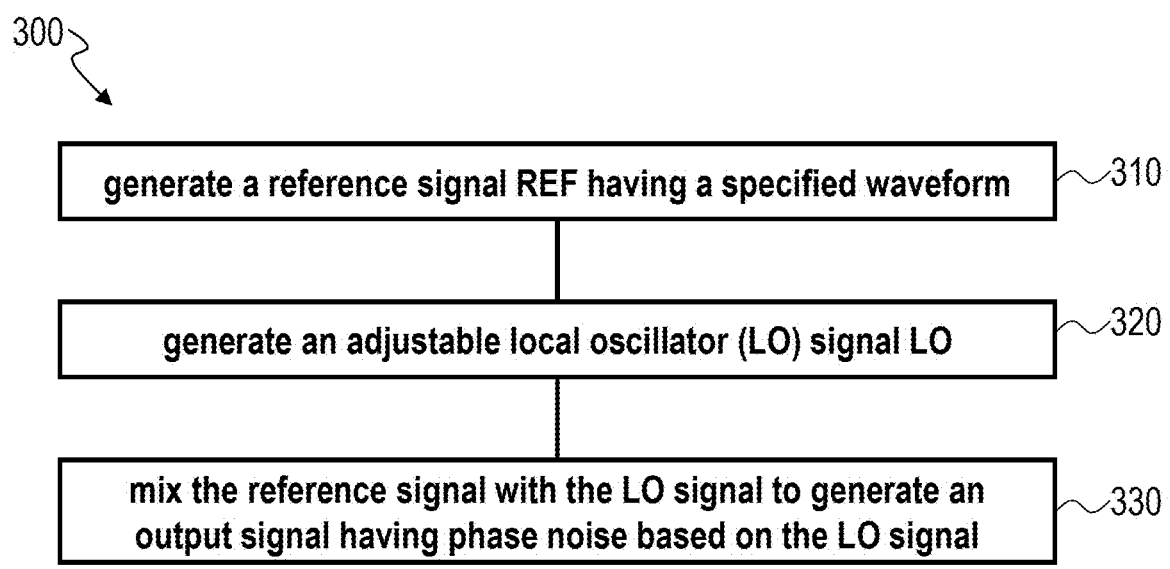
FIG. 4 illustrates in a flowchart a method for generating an output signal with adjustable phase noise according to an embodiment.

FIG. 4 illustrates an exemplary method 300 for generating an output signal OUT with adjustable phase noise. The method 300 may be carried out by e.g. the apparatus 100 and/or system 10 as described herein.

The method 300 comprises generating, 310, a reference signal REF having a specified waveform. Further, method 300 comprises generating, 320, an adjustable local oscillator (LO) signal LO. In addition, method 300 comprises mixing, 330, the reference signal with the LO signal to generate the output signal having phase noise based on the LO signal.

Although the present invention has been described in the above by way of embodiments, it is not limited thereto, but rather can be modified in a wide range of ways. In particular, the invention can be changed or modified in various ways without deviating from the core of the invention.

What we claim is:

1. An apparatus for generating an output signal with adjustable phase noise, the apparatus comprising:
    waveform generation circuitry configured to generate a reference signal;
    oscillator circuitry configured to generate an adjustable local oscillator (LO) signal
        wherein the oscillator circuitry is configured to generate the LO signal with user-defined phase noise based on input data, and the input data comprises phase noise characteristics specified by a user via a user interface; and
    mixer circuitry coupled to the waveform generation circuitry and the oscillator circuitry and configured to mix the reference signal with the LO signal to generate the output signal having phase noise based on the LO signal, wherein the mixer circuitry comprises an output node and is configured to provide the output signal to the output node,
    wherein the output signal is configured to be injected into a device under test (DUT) for evaluating effects of the phase noise on signal processing within the DUT.

2. The apparatus of claim 1, wherein the LO signal includes the phase noise.

3. The apparatus of claim 1, wherein the oscillator circuitry is configured to generate the LO signal with the phase noise based on white Gaussian noise filtered by a filter with a behavior corresponding to the phase noise.

4. The apparatus of claim 1, further comprising a modulated radio frequency (rf) signal source coupled to the oscillator circuitry, wherein the oscillator circuitry is configured to generate the LO signal based on a correspondingly modulated rf signal.

5. The apparatus of claim 1, wherein the oscillator circuitry is configured to receive data indicating specified phase noise characteristics, and to generate the LO signal based on the received data.

6. The apparatus of claim 5, further comprising a processing circuitry configured to generate the data indicating specified phase noise characteristics based on a phase noise curve input and control the oscillator circuitry to generate the LO signal based on the data.

7. The apparatus of claim 5, further comprising a processing circuitry configured to process the data indicating specified phase noise characteristics based on a phase noise curve input and control the oscillator circuitry to generate the LO signal based on the data.

8. The apparatus of claim 5, wherein the data indicating specified phase noise characteristics comprises in-phase-and-quadrature (I/Q) data.

9. The apparatus of claim 1, wherein the oscillator circuitry is configured for in-phase-and-quadrature (I/Q) modulation.

10. The apparatus of claim 1, wherein the reference signal is a baseband or an intermediate frequency (IF) signal.

11. The apparatus of claim 1, wherein the waveform generation circuitry comprises or is configured as an arbitrary waveform generator.

12. The apparatus of claim 1, wherein the waveform generation circuitry is external to and separate from the DUT.

13. The apparatus of claim 1, wherein the mixer circuitry comprises or is configured as an in-phase-and-quadrature (I/Q) modulator.

14. The apparatus of claim 1, wherein the apparatus is further configured to receive input data indicating desired characteristics of at least one of the desired output signal, the desired phase noise of the output signal, the desired LO signal, and the desired reference signal, to correspondingly cause at least one of the oscillator circuitry, the mixer circuitry or the waveform generation circuitry to generate its respective signal based on the input data.

15. A system for testing a device, the testing comprising injection of an output signal with adjustable phase noise into a device-under-test (DUT), the system comprising:
    a user interface configured to receive user input indicating at least a desired phase noise of an output signal; and
    an apparatus coupled to the user interface, the apparatus comprising:
    waveform generation circuitry configured to generate a reference signal;
    oscillator circuitry configured to generate an adjustable local oscillator (LO) signal,
        wherein the oscillator circuitry is configured to generate the LO signal with user-defined phase noise based on input data, and the input data comprises phase noise characteristics specified by a user via the user interface; and
    mixer circuitry coupled to the waveform generation circuitry and the oscillator circuitry and configured to mix the reference signal with the LO signal to generate the output signal based on the user input, the mixer circuitry comprising an output node configured to output the output signal to be injected into the DUT for evaluating effects of the phase noise on signal processing within the DUT.

16. A method for generating an output signal with adjustable phase noise to be injected into a device-under-test (DUT), the method comprising:
    generating a reference signal having a specified waveform;
    receiving input data comprising phase noise characteristics specified by a user via a user interface;
    generating an adjustable local oscillator (LO) signal, wherein the LO signal includes user-defined phase noise based on the input data;
    mixing the reference signal with the LO signal to generate the output signal OUT having phase noise based on the LO signal; and outputting the output signal to be injected into a device-under-test (DUT).

* * * * *